United States Patent Office 3,755,465
Patented Aug. 28, 1973

3,755,465
DIFUNCTIONAL BETA-HYDROXY PERESTERS
AND METHOD OF MAKING SAME
Yun Ger Chang, Austin, Tex., assignor to Reichhold
Chemicals, Inc., White Plains, N.Y.
No Drawing. Filed Mar. 9, 1971, Ser. No. 122,545
Int. Cl. C07c 73/02
U.S. Cl. 260—610 D                 1 Claim

ABSTRACT OF THE DISCLOSURE

Difunctional beta-hydroxy peresters are prepared by reacting beta-butyrolactone or beta-propiolactone with a difunctional hydroperoxide in the presence of either an acidic or a basic catalyst at a temperature ranging from about 0° C. to about 100° C. and at a preferred temperature ranging from about 20° C. to about 45° C. The mole ratio of beta-lactone to difunctional hydroperoxide may range from about 2:1 to about 3:1 with a preferred mole ratio ranging from about 2.0:1 to about 2.2:1. Compounds of this invention are highly efficient polymerization initiators and cross-linking agents.

This invention relates to some novel peroxides and methods of making them. Particularly, this invention relates to peroxides obtained by reactions of saturated beta-lactones with difunctional hydroperoxides. More particularly, the present invention is directed to peroxides derived from beta-butyrolactone and beta-propiolactone reacted with difunctional hydroperoxides.

Still more particularly the invention relates to the preparation of new difunctional beta-hydroxy peresters prepared by reacting beta-butyrolacetone or beta-propiolactone with a difunctional hydroperoxide in the presence of either an acidic or a basic catalyst at a temperature ranging from about 0° C. to about 100° C. and at a preferred temperature ranging from about 20° C. to about 45° C. The mole ratio of beta-lactone to difunctional hydroperoxide may range from about 2:1 to about 3:1 with a preferred mole ratio ranging from about 2.0:1 to about 2.2:1. Compounds of this invention are highly efficient polymerization initiators and cross-linking agents.

The new peroxides are difunctional beta-hydroxy peresters, namely difunctional peroxy beta-hydroxybutyrates and peroxy beta-hydroxy propionates. A large number of these new peroxides may be represented by the following general formula,

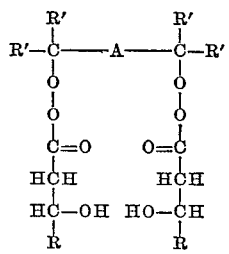

wherein R is hydrogen, alkyl or substituted alkyl; the R' radicals are the same or different members of the group consisting of alkyl, cycloalkyl, alkcycloalkyl, aralkyl, aryl, alkaryl, and the corresponding halo substituted groups; and A is a member of the group consisting of —CH$_2$—,

—CH$_2$—CH$_2$—, —CH=CH—, —C≡C—,

—CH$_2$—CH=CH—, and —CH$_2$—CH$_2$—CH$_2$—.

Another group of these difunctional peroxy beta-hydroxy esters may be shown by the following general formula,

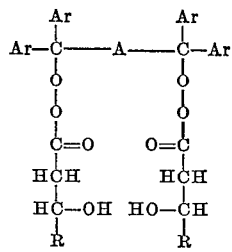

wherein Ar is an aryl, or an alkaryl group, R and A are the same as in the preceding paragraph.

Still another group of these difunctional beta-hydroxy peresters may have the formula as shown below,

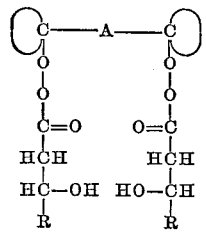

wherein

is a cycloaliphatic group, R and A are as mentioned above.

Due to the presence of a strained four-membered heterocyclic ring in their molecule, these beta-lactones are highly reactive substances. They can react with a reagent XY in either or both of two ways.

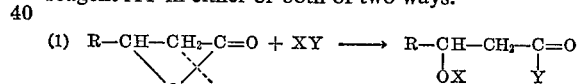

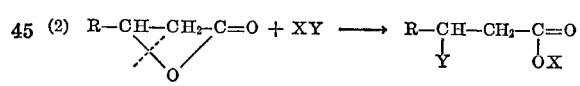

wherein, R is as previously indicated.

In the first equation, cleavage of the ring occurs at the carbonyl-oxygen bond, and in the second equation at the alkyl-oxygen bond. The location of cleavage depends on the experimental conditions as well as the chemical structures of the reagents and of the beta-lactones. It has been known that the hydrolysis and alcoholysis of beta-lactones involve the cleavage of carbonyl-oxygen bond in either an acidic or a basic medium, and the cleavage of alkyl-oxygen bond in a neutral medium. It is described in our co-pending application Ser. No. 18,687 that beta-propiolactone and beta-butyrolactone react with monohydroperoxides under either acidic or basic conditions to produce the corresponding beta-hydroxy peresters.

Organic difunctional peresters can ordinarily be prepared by reactions between acyl halides and difunctional hydroperoxides in basic media. No work has been reported concerning the conversion of beta-lactones into difunctional peresters.

An object of this invention is to provide novel peroxides which are highly efficient polymerization initiators and cross-linking agents.

Another object of this invention is to provide highly efficient methods for synthesizing such useful peroxides.

It is another object of the present invention to obtain organic peroxides from saturated beta-lactones reacted with difunctional hydroperoxides.

It is still another object of this invention to obtain difunctional beta-hydroxy peresters from saturated beta-lactones reacted with difunctional hydroperoxides.

It is a further object of the present invention to produce difunctional beta-hydroxy peresters, namely difunctional peroxy beta-hydroxy propionates and beta-hydroxy butyrates by the reactions of beta-propiolactone and of beta-butyrolactone with difunctional hydroperoxides, respectively.

These and other objects and advantages of the present invention will become apparent from the following detailed descriptions.

It has been found that these objects can be obtained by reacting saturated beta-lactones with difunctional hydroperoxides, in an inert solvent, in the presence of a base or an acid as a catalyst. The saturated beta-lactones employed in this invention are beta-propiolactone and beta-butyrolacetone.

The difunctional hydroperoxides used for the preparations of this invention may be represented by one of the general formulas:

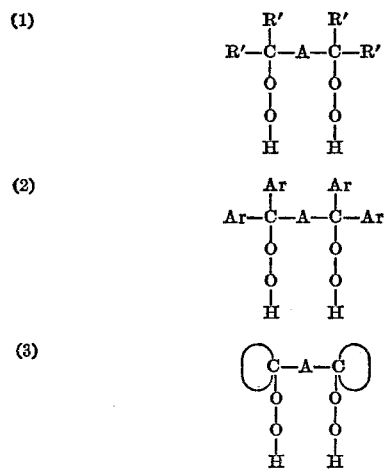

wherein A, R', Ar and

are the same as previously indicated. The group of these difunctional hydroperoxides consists of 2,5-dihydroperoxy-2,5-dimethylhexane,
3,6-dihydroperoxy-3,6-dimethyloctane,
2,5-dihydroperoxy-2,5-dimethylhexene-3,
3,6-dihydroperoxy-3,6-dimethyloctylene-4,
1,4-dihydroperoxy-1,1,4,4-tetraphenylbutyne-2,
bis(cyclohexyl-1-hydroperoxy)acetylene,
2,6-dihydroperoxy-2,6-dimethyloctene-4, and the like.

The reactions between saturated beta-lactones and difunctional hydroperoxides can be catalyzed by a base or by an acid. The base-catalyzed reaction appears to involve a nucleophilic attack on the carbon atom of the carbonyl group of the beta-lactone by the alkylperoxy anion, followed by an acyl cleavage. The probable mechanism may be illustrated as follows, using difunctional hydroperoxides of the first type as an example.

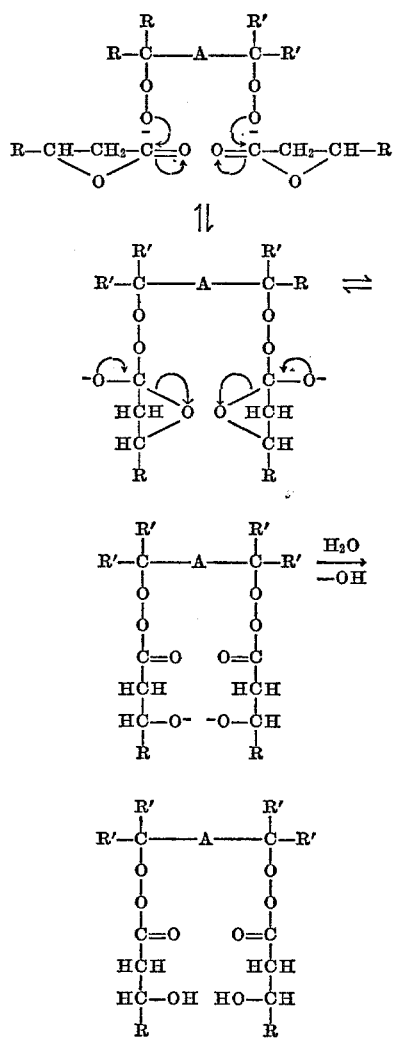

wherein R, R' and A are as previously indicated.

The acid-catalyzed reaction seems to be more complicated than the base-catalyzed reaction. The protonation of the beta-lactone may occur at the negatively polarized carbonyl oxygen as well as the other oxygen to form cations. Then, the beta-lactone ring is opened by acyl cleavage. When the proton attacks the carbonyl oxygen the reaction may be explained by the following mechanisms:

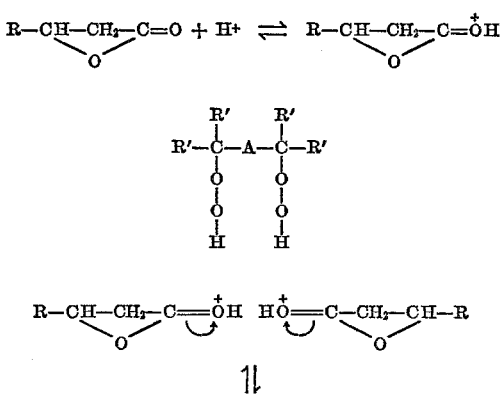

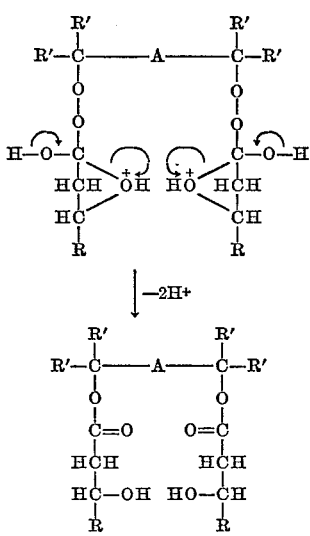

When the proton approaches the other oxygen atom the reaction may be illustrated below.

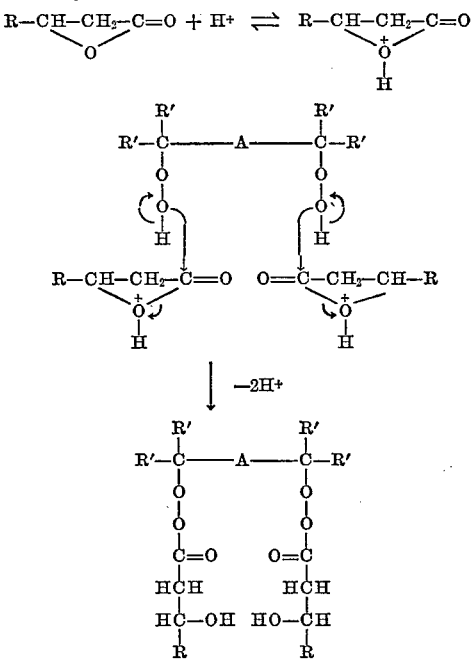

In these equations, R, R' and A are as previously indicated.

Since a molecule of the beta-hydroxy peresters contains two peroxide groups the theoretical value of the mole ratio of difunctional hydroperoxide to beta-lactone is in the order of 1:2. If the amount of difunctional hydroperoxide used for the reaction is larger than the theoretical amount some of the hydroperoxide groups will remain unreacted. Consequently, the final product will be accompanied by a peroxide bearing a perester group and a hydroperoxide group and even by the difunctional hydroperoxide when the latter is in considerable excess. In order to avoid the presence of hydroperoxide in the product, this mole ratio should never be greater than about 1:2. While the mole ratio may vary from about 1:2 to about 1:3, the preferred value is from about 1:2 to about 1:2.2.

Because some of the difunctional hydroperoxides employed in this invention are solids a solvent may be used for dissolving the solid reactant and for the reaction. Ethers, such as p-dioxane, tetrahydrofuran, diethyl ether, and the like are suitable solvents.

The reactions of this invention may take place at a temperature ranging from about 0° C. to about 100° C. To prevent possible hydrolysis of the difunctional perester product and side reactions, the reaction temperature should not be high. The preferred reaction temperature ranges from about 20° C. to about 45° C., on account of the outstanding results obtained therefrom.

The reactions of the present invention may be catalyzed either by an acid or by a base. The acidic catalyst includes sulfuric acid, hydrochloric acid, perchloric acid, phosphoric acid, benzenesulfonic acids, toluenesulfonic acids, trifluoromethanesulfonic acid, and the like. The basic catalyst may be an alkali metal hydroxide or an alkaline earth hydroxide, for example, sodium hydroxide, potassium hydroxide, calcium hydroxide, barium hydroxide, and the like. It has been found, however, that side-reactions occur, competing with the desired reaction between the difunctional hydroperoxide and beta-lactone when an acid catalyst is used. Therefore, it is preferred to use the basic catalyst for the practice of this invention. The quantity of the catalyst used for the reaction may vary from a small trace to about 30% based on the total weight of the reactants excluding the solvent. To avoid hydrolysis of the perester product and possible side-reactions, a low concentration of the base catalyst is preferred. The preferred amount ranges from about 1% to about 10%, based upon the total weight of reactants excluding the solvent.

The period of time required for the reaction depends upon the experimental conditions, especially, the reaction temperature and the amount of catalyst used. Because the carbonyl frequency of beta-lactones is in the range of 1800–1860 cm.$^{-1}$ and that of peresters falls in the range of 1740–1760 cm.$^{-1}$, the completion of the reaction can be determined by the infrared spectrum of the reaction mixture.

These novel difunctional $\beta$-hydroxy peresters have been found to be very good initiators in polymerization reactions, for example, the polymerization of styrene, alkyl methacrylates, vinyl esters, vinyl halides, unsaturated polyesters, and the like. They also provide very good cross-linking agents for polymers and copolymers of olefins, for example, polyethene, polypropylene, and the like.

Some of the representative reactions for preparing the difunctional $\beta$-hydroxy peresters are illustrated by the following examples.

Equation 1

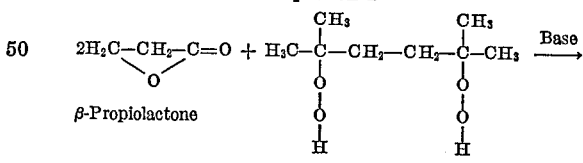

$\beta$-Propiolactone

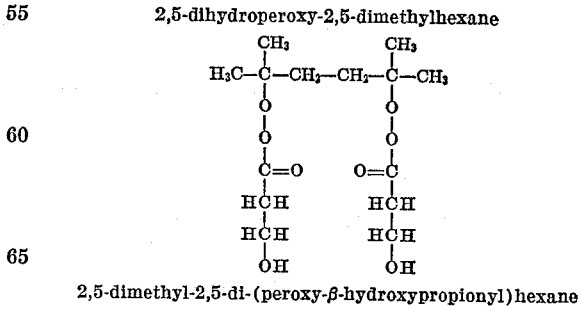

2,5-dimethyl-2,5-di-(peroxy-$\beta$-hydroxypropionyl)hexane

Equation 2

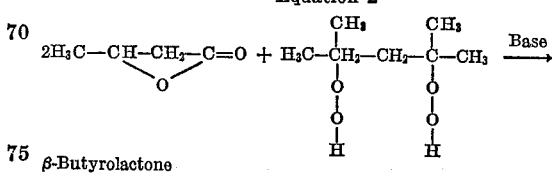

$\beta$-Butyrolactone

Equation 2—Continued

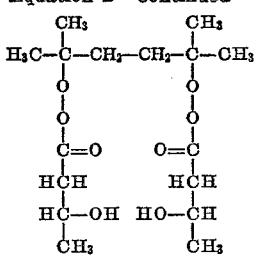

2,5-dimethyl-2,5-di(peroxy-β-hydroxybutyryl)hexane

Equation 3

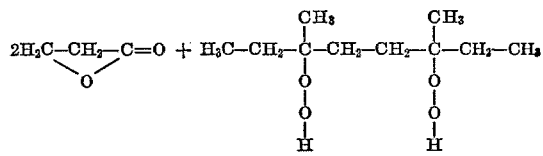

3,6-dihydroperoxy-3,6-dimethyloctane

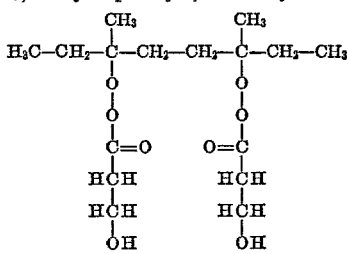

3,6-dimethyl-3,6-di-(peroxy-β-hydroxypropionyl)octane

Equation 4

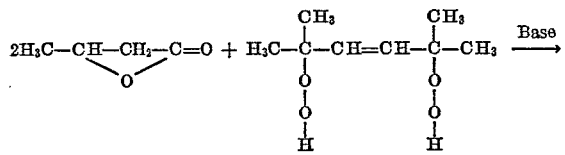

2,5-dihydroperoxy-2,5-dimethylhexene-3

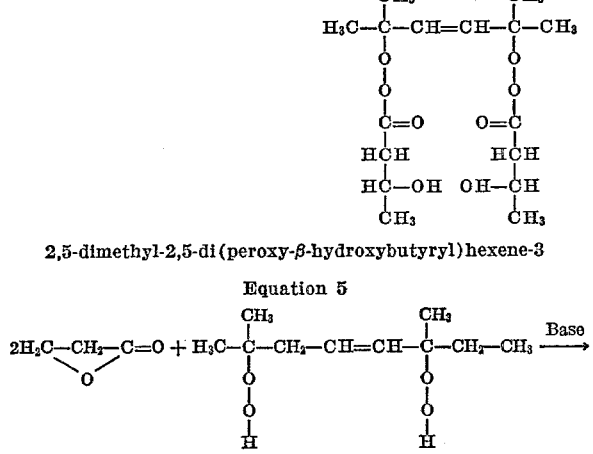

2,5-dimethyl-2,5-di(peroxy-β-hydroxybutyryl)hexene-3

Equation 5

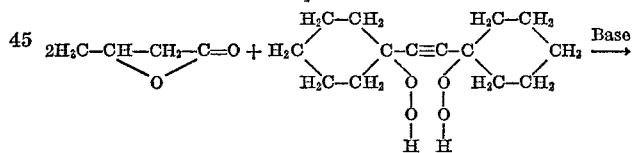

2,6-dihydroperoxy-2,6-dimethyloctene-4

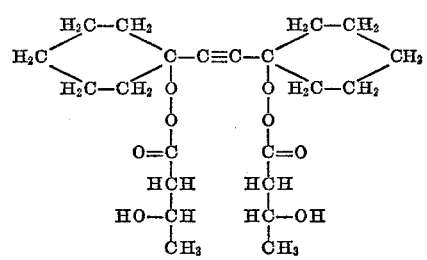

2,6-dimethyl-2,6-di-(peroxy-β-hydroxypropionyl)octene-4

Equation 6

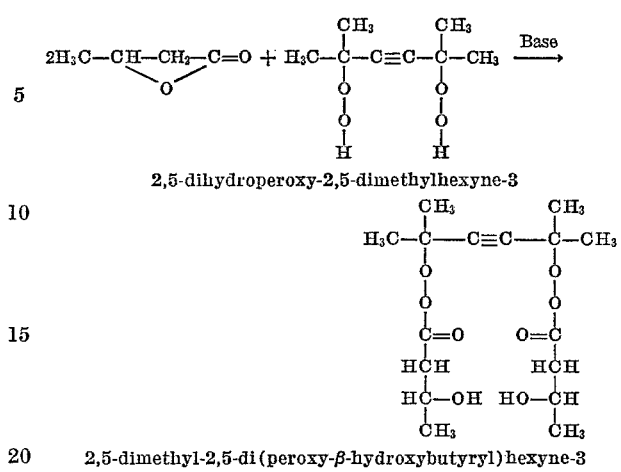

2,5-dihydroperoxy-2,5-dimethylhexyne-3

2,5-dimethyl-2,5-di(peroxy-β-hydroxybutyryl)hexyne-3

Equation 7

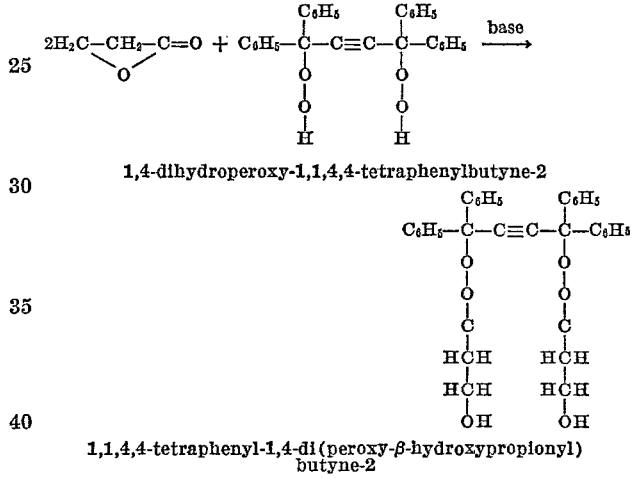

1,4-dihydroperoxy-1,1,4,4-tetraphenylbutyne-2

1,1,4,4-tetraphenyl-1,4-di(peroxy-β-hydroxypropionyl)butyne-2

Equation 8 bis(Cyclohexyl-1-hydroperoxy)acetylene

Bis(1-peroxy-β-hydroxy-butyrylcyclohexyl)acetylene

These difunctional beta-hydroxy peresters are heavy liquids at room temperature. It is hard to purify these peroxides by ordinary ways including distillation, extraction, treatment with special reagents to remove impurities without changing the perester products. It has been found that the preparative separation of these peroxides from the impurities may be achieved by column chromatography and by thin-layer chromatography. Although various adsorbents, for example, alumina, cellulose, and some carbonates, can be used, silica gel of neutral nature is preferred for the preparative separations.

Two suitable solvents were found for the preparative chromatographic separations of the organic peroxy products of the present invention, as shown below:

(1) a mixture of one volume of acetone and two volumes of carbon tetrachloride;
(2) a mixture of one volume of petroleum ether boiling at 36–60° C. and three volumes of diethyl ether.

The following examples are given for the purposes of illustrating the preparations of the present invention and not deemed to the be limitative thereto.

EXAMPLE 1

Preparation of 2,5-dimethyl-2,5-di(peroxy-beta-hydroxybutyryl)hexane

To a solution of 31.47 g. (0.15 mole) of 2,5-di-hydroperoxy-2,5-dimethylhexane, containing 14% of water, in 50 ml. of p-dioxane was added 13.34 g. (0.10 mole) of 30% sodium hydroxide aqueous solution at 15–20° C. with agitation. To the resulting mixture was added 25.80 g. (0.30 mole) of beta-butyrolactone at 15–20° C. with stirring. The reaction mixture was stirred at 35–40° C. for eight hours. The organic layer was separated from the aqueous layer. The aqueous solution was extracted with 50 ml. of ether. The ether extract was combined with the organic layer. The combination was washed three times with 50-ml. portions of water and, then, dried over anhydrous magnesium sulfate.

Filtration and removal of low-boiling materials under reduced pressure gave a clear colorless liquid product weighing 37.78 g., indicating a 71.9% yield based upon the amount of 2,5 - di-hydroperoxy-2,5-dimethylhexane used for the reaction. The crude product contained a trace of hydroperoxide as shown by the lead tetraacetate test, and contained 7.62% and 8.60% active oxygen as determined by the potassium iodide-sodium thiosulfate method and by the hydriodic acid-sodium thiosulfate method, respectively.

The peroxy product was purified by column chromatography using neutral silica gel as the adsorbent and a mixture of one volume of petroleum ether boiling at 36–60° C. and three volumes of diethyl ether as the solvent.

The purified product contained 7.77% and 7.90% active oxygen as determined by potassium iodide-sodium thiosulfate titration and by hydriodic acid-sodium thiosulfate method, respectively, as compared with the theoretical value 9.13%.

Analysis.—Calcd. for $C_{16}H_{30}O_8$: C, 54.84%; H, 8.63%; O, 36.53%; molecular weight, 350.4. Found: C, 54.60%; H, 8.90%; O, 36.49%; molecular weight, 323.

The infrared spectrum of this compound in a 15% solution in methylene chloride showed a medium band at 3550–3470 cm.$^{-1}$ due to OH groups; a strong band at 2980 cm.$^{-1}$ with a shoulder at 2890 cm.$^{-1}$ indicating —CH$_3$ and —CH$_2$— groups, respectively; a strong band at 1750 cm.$^1$ due to >CO groups of perester; a medium band at 1440 cm.$^{-1}$ due to —CH$_2$— and —CH$_3$ groups; a strong band at 1360 cm.$^{-1}$ with a shoulder at 1380 cm.$^{-1}$ due to —C(CH$_3$)$_2$— groups; a very strong, broad band with peaks at 1120 cm.$^{-1}$ and 1080 cm.$^{-1}$ and a weak shoulder at 1040 cm.$^{-1}$, indicating the —C—O— linkages; a medium band at 830 cm.$^{-1}$ representing peroxide groups.

A thin-layer chromatogram of this peroxide on a silica gel G film obtained when a mixture of one volume of acetone and two volumes of carbon tetrachloride was used as the solvent and hydriodic acid was the spraying agent showed only one brown spot, $R_f$ 0.79.

On the basis of these data and information the structure of this compound was assigned as shown in Equation 2.

EXAMPLE 2

Preparation of 2,5-dimethyl-2,5-di(peroxy-beta-hydroxypropionyl)hexane

To a solution of 54.00 g. (0.25 mole) of 2,5-dihydroperoxy-2,5-dimethylhexane, containing 17.50% of water, in 150 ml. of p-dioxane was added 16.00 g. (0.16 mole) of 40% sodium hydroxide aqueous solution at 15–20° C. with stirring. To the resulting mixture was added 39.60 g. (0.55 mole) of beta-propiolactone at 15–20° C. with agitation. The reaction mixture was stirred at 35–40° C. for about twelve hours. The organic layer was separated from the aqueous layer. And the aqueous layer was extracted with 100 ml. of diethyl ether. The ether solution was combined with the organic layer. The combination was washed twice with 50-ml. portions of about 10% sodium chloride solution and then dried over anhydrous magnesium sulfate.

Filtration and removal of diethyl ether and low-boiling materials under reduced pressure using a water aspirator and a rotating evaporator left a clear, colorless, heavy liquid product weighing 56.41 g., indicating a 70.0% yield, based upon the quantity of 2,5-dihydroperoxy-2,5-dimethylhexane used for the reaction. The crude product contained some hydroperoxide as indicated by the lead tetraacetate test, and had 8.54% and 9.84% active oxygen as determined by potassium iodide-sodiumthiosulfate method and hydriodic acid-sodium thiosulfate method, respectively.

The peroxy product was purified by either column chromatography or thin-layer chromatography. In both cases, the solvent was a mixture of one volume of petroleum ether boiling at 36–60° C. and three volumes of diethyl ether. The column was packed with neutral silica gel powder while silica gel G films of 1-mm. thickness were employed in the thin-layer chromatographic purification.

The purified product contained almost no hydroperoxide as shown by lead tetraacetate test, and 10.53% and 10.05% active oxygen as determined by potassium iodide-sodium thiosulfate method and by hydriodic acid-sodium thiosulfate method, respectively, comparing with the theoretical value 9.92%. It showed $d^{25}$ 1.166, $n_D^{25}$ 1.4590, MR (obsd.) 75.60, MR (calcd.) 77.54.

Analysis.—Calcd. for $C_{16}H_{24}O_8$: C, 52.17%; H, 8.13%; O, 39.70%; molecular weight, 322. Found: C, 52.25%; H, 9.01%; O, 3839%; molecular weight, 341.

The infrared spectrum of this peroxide in a 15% solution in methylene chloride showed a strong band at 3450 cm.$^{-1}$ due to —OH groups; a strong band at 2950 cm.$^{-1}$ with a shoulder at 2880 cm.$^{-1}$ due to —CH$_3$ and —CH$_2$— groups, respectively; a strong band at 1740 cm.$^{-1}$ indicating >CO groups of perester; a medium band at 1440 cm.$^{-1}$ due to —CH$_2$—, —CH$_3$, and perhaps —CH$_2$OH groups; a strong band at 1350 cm.$^{-1}$ due to —C(CH$_3$)$_2$— groups; a strong, broad band with peaks at 1200 cm.$^{-1}$, 1140 cm.$^{-1}$, 1080 cm.$^{-1}$, and 1040 cm.$^{-1}$ indicating —C—O— linkages; a medium band at 830 cm.$^{-1}$ representing peroxide groups.

On the basis of these data and results, this compound should be represented by the structure as shown in Equation 1.

EXAMPLE 3

Preparation of 3,6-dimethyl-3,6-di(peroxy-beta-hydroxybutyryl)octane

To a mixture of 20.60 g. (0.10 mole) of 3,6-dihydroperoxy-3,6-dimethyloctane in 30 ml. of p-dioxane was added 6.00 g. (0.05 mole) of 30% sodium hydroxide aqueous solution at 15–20° C. with agitation. To the resulting mixture was added 18.92 g. (0.22 mole) of beta-butyrolactone at 15–20° C. with stirring. The reaction mixture was stirred at 35–40° C. for eight hours. The organic layer was separated and dissolved in 50 ml. of diethyl ether. The ether solution was washed three times with 30 ml. portions of water and dried over anhydrous magnesium sulfate.

Filtration and removal of low-boiling materials under reduced pressure left a heavy liquid peroxy product, in a 70% yield, based upon the amount of 3,6-dihydroperoxy-3,6-dimethyloctane used for the reaction. The product was purified by column chromatography, using a silica gel column and a mixture of one volume of petroleum ether boiling at 36–60° C. and three volumes of diethyl ether as the solvent. The purified product was identified as a difunctional perester having the structure as shown below.

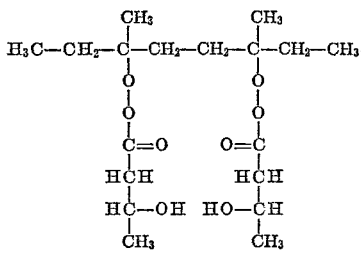

EXAMPLE 4

Preparation of 3,6-dimethyl-3,6-di(peroxy-beta-hydroxypropionyl)octane

To a solution of 20.60 g. (0.10 mole) of 3,6-dihydroperoxy-3,6-dimethyloctane in 30 ml. of p-dioxane was added 6.00 g. (0.05 mole) of 30% sodium hydroxide aqueous solution at 15–20° C. with stirring. To the resulting mixture was added 15.84 g. (0.22 mole) of beta-propiolactone at 15–20° C. with agitation. The reaction mixture was stirred at 35–40° C. for eight hours. The organic layer was separated and dissolved in 50 ml. of diethyl ether. The ether solution was washed three times with 30-ml. portions of water and dried over anhydrous magnesium sulfate.

Filtration and removal of low-boiling materials under reduced pressure gave a liquid peroxy product in 75.0% yield, based upon the amount of 3,6-dihdroperoxy-3,6-dimethyloctane used for the reaction. The product was purified by column chromatography, using a silica gel column and a mixture of one volume of petroleum ether boiling at 36–60° C. and three volumes of diethyl ether as a solvent. The product was identified as a difunctional perester having the structure as shown in Equation 3.

EXAMPLE 5

Preparation of 2,5-dimethyl-2,5-di(peroxy-beta-hydroxybutyryl)hexene-3

To a solution of 17.60 g. (0.10 mole) of 2,5-dihydroperoxy-2,5-dimethylhexene-3 in 30 ml. of p-dioxane was added 6.00 g. (0.05 mole) of 30% sodium hydroxide aqueous solution at 15–20° C. with stirring. To the resulting mixture was added 18.92 g. (0.22 mole) of beta-butyrolactone at 15–20° C. with stirring. The reaction mixture was stirred at 35–40° C. for eight hours. The organic layer was separated and dissolved in 50 ml. of diethyl ether. The ether solution was washed three times with 30-ml. portions of water, and then dried over anhydrous magnesium sulfate.

Filtration and removal of solvent and low-boiling materials under reduced pressure left a heavy liquid peroxy product, in a 70.0% yield, based upon the amount of 2,5-dihydroperoxy-2,5-dimethylhexene-3 used for the reaction. The product was purified by passing through a silica gel column using a mixture of one volume of petroleum ether boiling at 36–60° C. and three volumes of diethyl ether as solvent. It was identified as a perester having the structure as shown in Equation 4.

EXAMPLE 6

Preparation of 2,5-dimethyl-2,5-di(peroxy-beta-hydroxypropionyl)hexene-3

To a solution of 17.60 g. (0.10 mole) of 2,5-dihydroperoxy-2,5-dimethylhexene-3 in 30 ml. of p-dioxane was added 6.00 g. (0.05 mole) of 30% sodium hydroxide aqueous solution at 15–20° C. with agitation. To the resulting mixture was added 15.84 g. (0.22 mole) of beta-propiolactone at 15–20° C. with stirring. The reaction mixture was stirred at 35–40° C. for about eight hours. The organic layer was separated and dissolved in 50 ml. of diethyl ether. The ether solution was washed three times with 30 ml. portions of water and then dried over anhydrous magnesium sulfate.

Filtration and removal of low-boiling materials under reduced pressure gave a heavy liquid peroxy product, in a 75.0% yield, based upon the quantity of 2,5-dihydroperoxy-2,5-dimethylhexene-3 used for the reaction. The product purified by column chromatography as described in the preceding experiment. It was identified as a hydroxy perester having the structure as shown below.

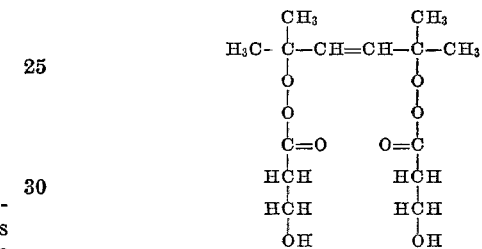

EXAMPLE 7

Preparation of 2,6-dimethyl-2,6-di(peroxy-beta-hydroxybutyryl)octene-4

To a solution of 20.40 g. (0.10 mole) of 2,6-dihydroperoxy-2,6-dimethyloctene-4 in 45 ml. of p-dioxane was added 6.00 g. (0.05 mole) of 30% sodium hydroxide aqueous solution at 15–20° C. with agitation. To the resulting mixture was added 18.92 g. (0.22 mole) of beta-butyrolactone at 15–20° C. with stirring. The reaction mixture was stirred at 35–40° C. for about eight hours. The organic layer was separated and dissolved in 50 ml. of diethyl ether. The resulting ether solution was washed three times with 30-ml. portions of water and then dried over anhydrous magnesium sulfate.

Filtration and removal of low-boiling materials under reduced pressure gave a heavy liquid peroxy product, in a 70.0% yield, based upon the amount of the difunctional hydroperoxide used for the reaction. The product was purified by column chromatography, as described in the preceding examples. And the purified product was identified as a hydroxy perester, represented by the following structure.

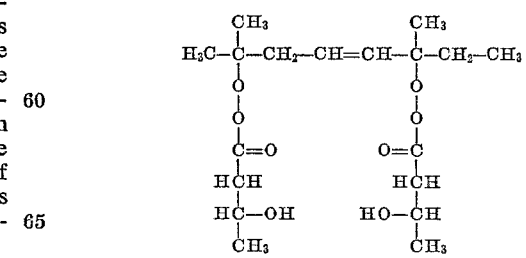

EXAMPLE 8

Preparation of 2,6-dimethyl-2,6-di(peroxy-beta-hydroxypropionyl)octene-4

To a solution of 20.40 g. (0.10 mole) of 2,6-dihydroperoxy-2,6-dimethyloctene-4 in 45 ml. of p-dioxane was added 6.00 g. (0.05 mole) of 30% sodium hydroxide aqueous solution at 15–20° C. with agitation. To the resulting mixture was added 15.84 g. (0.22 mole) of beta-propiolactone at 15–20° C. with stirring. The reaction mixture was stirred at 35–40° C. for about eight hours. The organic layer was separated and dissolved in 50 ml. of diethyl ether. The resulting solution was washed three times with 30-ml. portions of water and then dried over anhydrous magnesium sulfate.

Filtration and removal of low-boiling materials under reduced pressure left a heavy liquid peroxy product, in a 70.0% yield, based upon the amount of the difunctional hydroperoxide used for the reaction. The product was purified by colunm chromatography as described in the preceding examples. It was identified as a hydroxy perester having the structure as shown in Equation 5.

EXAMPLE 9

Preparation of 2,5-dimethyl-2,5-di(peroxy-beta-hydroxybutyryl)hexane-3

To a solution of 17.40 g. (0.10 mole) of 2,5-dihydroperoxy-2,5-dimethylhexyne-3 in 30 ml. of p-dioxane was added 6.00 g. (0.05 mole) of 30% sodium hydroxide aqueous solution at 15–20° C. with agitation. To the resulting mixture was added 18.92 g. (0.22 mole) of beta-butyrolactone at 15–20° C. with stirring. The reaction mixture was stirred at 35–40° C. for about eight hours. The organic layer was separated and dissolved in 50 ml. of diethyl ether. The resulting solution was washed three times with 30-ml. portions of water and dried over anhydrous magnesium sulfate.

Filtration and removal of low-boiling materials under reduced pressure gave a heavy liquid product, in a 75.0% yield, based upon the quantity of the difunctional hydroperoxide used for the reaction. The product was purified by column chromatography as described in the preceding examples. It was identified as a hydroxy perester, represented by the structure as shown in Equation 6.

EXAMPLE 10

Preparation of 2,5-dimethyl-2,5-di(peroxy-beta-hydroxypropionyl)hexyne-3

To a solution of 17.40 g. (0.10 mole) of 2,5-dihydroperoxy-2,5-dimethylhexyne-3 in 30 ml. of p-dioxane was added 6.00 g. (0.05 mole) of 30% sodium hydroxide aqueous solution at 15–20° C. with agitation. To the resulting mixture was added 15.84 g. (0.22 mole) of beta-propiolactone at 15–20° C. with stirring. The reaction mixture was stirred at 35–40° C. for about eight hours. The organic layer was separated and dissolved in 50 ml. of diethyl ether. The resulting solution was washed three times with 30-ml. portions of water and dried over anhydrous magnesium sulfate.

Filtration and removal of low-boiling materials under reduced pressure left a heavy liquid product, in a 70.0% yield, based upon the amount of the difunctional hydroperoxide used for the reaction. After purification by column chromatography as described in the preceding examples, the product was identified as a hydroxy perester having the following structure:

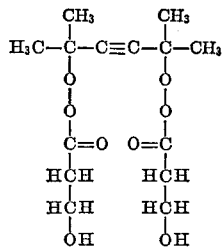

EXAMPLE 11

Preparation of 1,1,4,4-tetraphenyl-1,4-di(peroxy-beta-hydroxybutyryl)butyne-2

To a solution of 21.10 g. (0.05 mole) of 1,4-dihydroperoxy-1,1,4,4-tetraphenylbutyne-2 in 45 ml. of p-dioxane was added 6.00 g. (0.05 mole) of 30% sodium hydroxide aqueous solution at 15–20° C. with agitation. To the resulting mixture was added 9.46 g. (0.11 mole) of beta-butyrolactone at 15–20° C. with stirring. The reaction mixture was stirred at 35–40° C. for about eight hours. The organic layer was separated and dissolved in 50 ml. of diethyl ether. The ether solution was washed three times with 30-ml. portions of water and then dried over anhydrous magnesium sulfate.

Filtration and removal of low-boiling materials under reduced pressure left a heavy liquid product, in a 70.0% yield, based upon the amount of the difunctional hydroperoxide used for the reaction. The product was purified by column chromatography, as described in the preceding examples, and identified as a perester having the following structure.

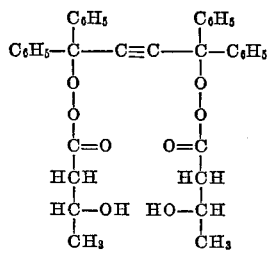

EXAMPLE 12

Preparation of 1,1,4,4-tetraphenyl-1,4-di(peroxy-beta-hydroxypropionyl)butyne-2

To a solution of 21.10 g. (0.05 mole) of 1,4-dihydroperoxy-1,1,4,4-tetraphenylbutyne-2 in 45 ml. of p-dioxane was added 6.00 g. (0.05 mole) of 30% sodium hydroxide aqueous solution at 15–20° C. with agitation. To the resulting mixture was added 7.92 g. (0.11 mole) of beta-propiolactone at 15–20° C. with stirring. The reaction mixture was stirred at 35–40° C. for about eight hours. The organic layer was separated and dissolved in 50 ml. of diethyl ether. The resulting solution was washed three times with 30-ml. portions of water and dried over anhydrous magnesium sulfate.

Filtration and removal of low-boiling materials under reduced pressure gave a heavy liquid product, in a 70.0% yield, based upon the amount of the difunctional hydroperoxide used for the reaction. The product was purified by column chromatography, as described in the preceding examples, and identified as a hydroxy perester, represented by the structure as shown in Equation 7.

EXAMPLE 13

Preparation of bis(1-peroxy-beta-hydroxybutyrylcyclohexyl)acetylene

To a solution of 25.40 g. (0.10 mole) of bis(cyclohexyl-1-hydroperoxy)acetylene in 50 ml. of p-dioxane was added 6.00 g. (0.05 mole) of 30% sodium hydroxide aqueous solution at 15–20° C. with agitation. To the resulting mixture was added 18.92 g. (0.22 mole) of beta-butyrolactone at 15–20° C. with stirring. The reaction mixture was stirred at 35–40° C. for about eight hours. The organic layer was separated and dissolved in 50 ml. of diethyl ether. The ether solution was washed three times with 30-ml. portions of water and dried over anhydrous magnesium sulfate.

Filtration and removal of low-boiling materials under reduced pressure gave a liquid product, in a 70.0% yield, based upon the amount of the difunctional hydroperoxide used for the reaction. The product was purified by column chromatography, as described in the preceding examples, and identified as a hydroxy perester having the structure as shown in Equation 8.

EXAMPLE 14

Preparation of bis(1-peroxy-beta-hydroxypropionylcyclohexyl)acetylene

To a solution of 25.40 g. (0.10 mole) of bis(cyclohexyl-1-hydroperoxy)acetylene in 50 ml. p-dioxane was added 6.00 g. (0.05 mole) of 30% sodium hydroxide aqueous solution at 15–20° C. with agitation. To the resulting mixture was added 15.84 g. (0.22 mole) of beta-propiolactone at 15–20° C. with stirring. The reaction mixture was stirred at 35–40° C. for about eight hours. The organic layer was separated and dissolved in 50 ml. of diethyl ether. The ether solution was washed three times with 30-ml. portions of water, and dried over anhydrous magnesium sulfate.

Filtration and removal of low-boiling materials under reduced pressure left a liquid product, in a 70.0% yield, based upon the amount of the difunctional hydroperoxide used for the reaction. The product was purified by column chromatography as described in the preceding examples, and identified as a hydroxy perester having the following structure:

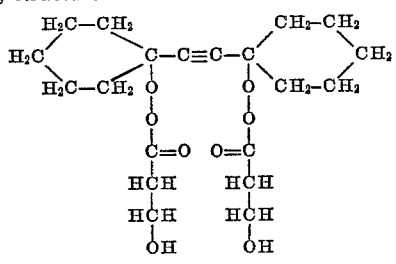

EXAMPLE 15

Preparation of 2,5-dimethyl-2,5-di(peroxy-beta-hydroxybutyryl)hexane in the presence of potassium hydroxide To a mixture of 31.47 g. (0.15 mole) of 2,5-dihydroperoxy - 2,5 - dimethylhexane, containing 15% of water, 18.67 g. (0.10 mole) of 30% potassium hydroxide aqueous solution, and 100 ml. of diethyl ether, in a round flask fitted with a thermometer, a stirrer and a reflux condenser, was added 25.80 g. (0.30 mole) of beta-butyrolactone at 25° C. with agitation. The reaction mixture was stirred and refluxed at 35° C. for eight hours. The organic layer was separated from the small amount of aqueous layer, and washed three times with 30-ml. portions of water. Finally, it was dried over anhydrous magnesium sulfate. After filtration and removal of low-boiling materials under reduced pressure, a liquid product was obtained, in a 70% yield based upon the amount of 2,5-dihydroperoxy-2,5-dimethylhexane used for the reaction. The product was purified by column chromatography while neutral silica gel powder served as the adsorbent and a mixture of one volume of petroleum ether boiling at 36–60° C. and three volumes of diethyl ether was the solvent. The purified product was identified as a perester having the structure in Equation 2.

EXAMPLE 16

Preparation of 2,5-dimethyl-2,5-di(peroxy-beta-hydroxybutyryl)hexane in the presence of sulfuric acid To a solution of 31.47 g. (0.15 mole) of 2,5-dihydroperoxy-2,5-dimethylhexane, containing 14% of water, in 100 ml. of diethyl ether in a 500-ml. round flask equipped with a stirrer, a thermometer, and a reflux condenser, was added 7.00 g. (0.05 mole) of 70% sulfuric acid, at 25° C., with stirring. To the resulting mixture was added 25.80 g. (0.30 mole) of beta-butyrolactone, at 25° C., with agitation. The reaction mixture was stirred and refluxed, at 35° C., for eight hour. The organic layer was separated from the small amount of aqueous solution, and washed three times with 30-ml. portions of saturated sodium bicarbonate solution and once with 30 ml. of water. Finally, it was dried over anhydrous magnesium sulfate.

Filtration and removal of low-boiling materials under reduced pressure using a water aspirator and a rotating evaporator, left a heavy liquid peroxy product, in a 60% yield, based upon the amount of 2,5-dihydroperoxy-2,5-dimethylhexane used for the reaction. The product was purified by column chromatography using neutral silica gel powder as the adsorbent and a mixture of one volume of petroleum ether, boiling at 36–60° C., and three volumes of diethyl ether as the solvent. It was identified as a difunctional perester having the structure as shown in Equation 2.

EXAMPLE 17

Preparation of 3,6-dimethyl-3,6-di(peroxy-beta-hydroxybutyryl)octane in the presence of p-toluenesulfonic acid To a solution of 20.60 g. (0.10 mole) of 3,6-dihydroperoxy-3,6-dimethyloctane in 100 ml. of diethyl ether in a 500-ml. round flask fitted with a stirrer, a thermometer and a reflux condenser, was added 9.50 g. (0.05 mole) of p-toluenesulfonic acid containing one mole of crystalline water at 25° C. with stirring. To the resulting mixture was added 18.92 g. (0.22 mole) of beta-butyrolactone at 25° C. with agitation. The reaction mixture was stirred and refluxed at 35° C. for eight hours. Then, it was washed once with 30 ml. of water, twice with 30-ml. portions of saturated sodium bicarbonate solution and once again with 30-ml. of water, and finally dried over anhydrous magnesium sulfate.

Filtration and removal of low-boiling materials under reduced pressure left a heavy liquid product, in a 60% yield based upon the amount of 3,6-dihydroperoxy-3,6-dimethyloctane used for the reaction. The product was purified by column chromatography using a silica gel column while a mixture of one volume of petroleum ether boiling at 36–60° C. and three volumes of diethyl ether served as the solvent. The purified product was identified as a difunctional perester represented by the structure as shown in Example 3.

EXAMPLE 18

Preparation of 2,5-dimethyl-2,5-di(peroxy-beta-hydroxybutyryl)hexene-3 in the presence of perchloric acid To a solution of 17.60 g. (0.10 mole) of 2,5-dihydroperoxy-2,5-dimethylhexene-3 in 80 ml. of tetrahydrofuran was added 8.37 g. (0.05 mole) of 60% perchloric acid at 25° C. with stirring. To the resulting mixture was added 13.92 g. (0.22 mole) of beta-butyrolactone at 25° C. with agitation. The reaction mixture was stirred at 35–40° C. for eight hours. It was then mixed with 80 ml. of diethyl ether. The resulting mixture was washed twice with 30-ml. portions of saturated sodium bicarbonate solution and once with 30 ml. of water. Finally, it was dried over anhydrous magnesium sulfate.

Filtration and removal of low-boiling materials under reduced pressure gave a liquid product, in a 60% yield based on the amount of the difunctional hydroperoxide used for the reaction. It was purified by passing through a silica gel column using a mixture of one volume of petroleum ether boiling at 36–60° C. and three volumes of diethyl ether as the solvent. The purified product was identified as the difunctional perester having the structure as shown in Equation 4.

EXAMPLE 19

Preparation of 2,5-dimethyl-2,5-di(peroxy-beta-hydroxybutyryl)hexyne-3 in the presence of hydrochloric acid To a mixture of 17.40 g. (0.10 mole) of 2,5-dihydroperoxy-2,5-dimethylhexyne-3, 4.10 g. (0.05 mole) of 45% hydrochloric acid and 80 ml. of tetrahydrofuran was added 18.92 g. (0.22 mole) of beta-butyrolactone at 25° C. with agitation. The resulting mixture was stirred at 35–40° C. for eight hours. The reaction mixture was diluted with 80 ml. of diethyl ether, and washed twice with 30-ml. portions of saturated sodium bicarbonate solution and once with 30 ml. of water. Finally, it was dried over anhydrous magnesium sulfate.

Filtration and removal of low-boiling materials under reduced pressure gave a liquid product, in a 60% yield based upon the amount of the difunctional hydroperoxide used for the reaction. The product was purified by column chromatography as described in the preceding examples, and identified as the difunctional perester having the structure as indicated in Equation 6.

EXAMPLE 20

Preparation of 1,1,4,4-tetraphenyl-1,4-di(peroxy-beta-hydroxybutyryl)butyne-2 in the presence of phosphoric acid To a mixture of 21.10 g. (0.05 mole) of 1,4-dihydroperoxy-1,1,4,4-tetraphenylbutyne-2, 2.88 g. (0.025 mole) of 85% phosphoric acid and 50 ml. of p-dioxane was added 9.46 g. (0.11 mole) of beta-butyrolactone at 25° C. with agitation. The reaction mixture was stirred at 35–40° C. for eight hours. Then, it was mixed with 50 ml. of diethyl ether, and washed twice with 30-ml. portions of saturated sodium bicarbonate solution and once with 30 ml. of water. After drying with anhydrous magnesium sulfate and removing the low-boiling materials under reduced pressure, a liquid product was obtained in a 60% yield based upon the quantity of the difunctional hydroperoxide used for the reaction. The product was purified by column chromatography as described in the preceding examples and identified as the difunctional perester represented by the structural formula as shown in Example 11.

EXAMPLE 21

Preparation of 2,5-dimethyl-2,5-di(peroxy-beta-hydroxypropionyl)hexane in the presence of potassium hydroxide To a mixture of 20.70 g. (0.10 mole) of 2,5-dihydroperoxy-2,5 - dimethylhexane containing 14% of water, 9.34 g. (0.05 mole) of 30% potassium hydroxide aqueous solution, and 100 ml. of diethyl ether, in a round flask fitted with a stirrer, a thermometer and a reflux condenser, was added 15.84 g. (0.22 mole) of beta-propiolactone at 25° C. with agitation. The resulting mixture was stirred and refluxed at 35° C. for eight hours. The ether solution was separated from the aqueous layer, washed twice with 30-ml. portions of water, and dried over anhydrous magnesium sulfate. After filtration and removal of low-boiling materials under reduced pressure, a liquid product was obtained in 70% yield based upon the quantity of the difunctional hydroperoxide used for the reaction. It was purified by column chromatography as described in the preceding examples and identified as a hydroxy perester having the structure as shown in Equation 1.

EXAMPLE 22

Preparation of 2,5-dimethyl-2,5-di(peroxy-beta-hydroxypropionyl)hexane in the presence of phosphoric acid To a mixture of 20.70 g. (0.10 mole of 2,5-dihydroperoxy 2,5 - dimethylhexane containing 14% of water, 5.76 g. (0.05 mole) of 85% phosphoric acid and 80 ml. of diethyl ether, in a 250-ml. round flask fitted with a stirrer, a thermometer and a reflux condenser, was added 15.84 g. (0.22 mole) of beta-propiolactone at 25° C. with agitation. The reaction mixture was stirred and refluxed at 35° C. for eight hours. The organic layer was separated, and washed three times with 30-ml. portions of saturated sodium bicarbonate solution and once with 30 ml. of water. Then, it was dried over anhydrous magnesium sulfate.

Filtration and removal of low-boiling materials under reduced pressure gave a liquid product in a 60% yield based upon the amount of difunctional hydroperoxide used for the reaction. The product was purified by column chromatography, using a silica gel column and a mixture of one volume of petroleum ether boiling at 36–60° C. and three volumes of diethyl ether as the solvent. The compound was identified as a hydroxy perester having the structure as shown in Equation 1.

EXAMPLE 23

Preparation of 3,6-dimethyl-3,6-di(peroxy-beta-hydroxypropionyl)octane in the presence of hydrochloric acid To a mixture of 20.60 g. (0.10 mole) of 3,6-dihydroperoxy-3,6-dimethyloctane, 4.10 g. (0.05 mole) of 45% hydrochloric acid and 80 ml. of tetrahydrofuran was added 15.84 g. (0.22 mole) of beta-propiolactone at 25° C. with agitation. The resulting mixture was stirred at 35–40° C. for eight hours. The reaction mixture was mixed with 80 ml. of diethyl ether, washed twice with 30-ml. portions of saturated sodium bicarbonate solution and once with 30 ml. of water, and dried over anhydrous magnesium sulfate.

Filtration and removal of low-boiling materials under reduced pressure left a liquid product in a 60% yield based upon the amount of difunctional hydroperoxide used for the reaction. The product was purified by column chromatography as described in the preceding examples, and identified as a difunctional hydroxy perester having the structure as indicated in Equation 3.

EXAMPLE 24

Preparation of 2,5-dimethyl-2,5-di(peroxy-beta-hydroxypropionyl)hexene-3 in the presence of p-toluenesulfonic acid To a mixture of 17.60 g. (0.10 mole) of 2,5-dihydroperoxy-2,5-dimethylhexene-3, 9.50 g. (0.05 mole) of p-toluenesulfonic acid, containing one mole of crystalline water, and 80 ml. of diethyl ether, in a 250-ml. round flask equipped with a stirrer, a thermometer and a reflux condenser, was added 15.84 g. (0.22 mole) of beta-propiolactone at 25° C. with agitation. The resulting mixture was stirred and refluxed at 35° C. for eight hours. Then, it was washed twice with 30 ml. portions of saturated sodium bicarbonate solution and once with 30 ml. of water, and dried over anhydrous magnesium sulfate.

Filtration and removal of low-boiling materials under reduced pressure left a liquid product in a 60% yield based on the amount of difunctional hydroperoxide used for the reaction. The product was purified by column chromatography as described in the preceding examples, and identified as a hydroperoxy perester having the structure as shown in Example 6.

EXAMPLE 25

Preparation of 2,5-dimethyl-2,5-di(peroxy-beta-hydroxypropionyl)hexyne-3 in the presence of perchloric acid To a mixture of 17.40 g. (0.10 mole) of 2,5-dihydroperoxy - 2,5 - dimethylhexyne-3, 8.37 g. (0.05 mole) of 60% perchloric acid, and 80 ml. of tetrahydrofuran, was added 15.84 g. (0.22 mole) of beta-propiolactone at 25° C. with agitation. The resulting mixture was stirred at 35–40° C. for eight hours. Then, it was mixed with 80 ml. of diethyl ether, washed twice with 30-ml. portions of saturated sodium bicarbonate and once with 30 ml. of water, and finally dried over anhydrous magnesium sulfate.

Filtration and removal of low-boiling materials under reduced pressure gave a liquid product in 60% yield based on the amount of the difunctional hydroperoxide used for the reaction. The product was purified by column chromatography as described in the preceding examples, and identified as the perester having the structure as indicated in Example 10.

EXAMPLE 26

Preparation of 1,1,4,4-tetraphenyl-1,4-di(peroxy-beta-hydroxypropionyl)butyne-2 in the presence of sulfuric acid To a mixture of 21.10 g. (0.05 mole) of 1,4-dihydroperoxy-1,1,4,4-tetraphenylbutyne-2, 4.20 g. (0.03 mole) of 70% sulfuric acid, and 45 ml. of p-dioxane, was added 7.92 g. (0.11 mole) of beta-propiolactone at 25° C. with agitation. The resulting mixture was stirred at 35–40° C. for eight hours. Then, it was mixed with 50 ml. of diethyl ether, washed twice with 30-ml. portions of saturated sodium bicarbonate solution and once with 30 ml. of water, and finally dried over anhydrous magnesium sulfate.

Filtration and removal of low-boiling materials under reduced pressure left a liquid product in 60% yield based upon the quantity of the difunctional hydroperoxide used for the reaction. The product was purified by column chromatography as indicated in the preceding examples and identified as the perester having the structure as shown in Equation 7.

I claim:

1. A difunctional beta-hydroxy perester having a general formula selected from the group consisting of:

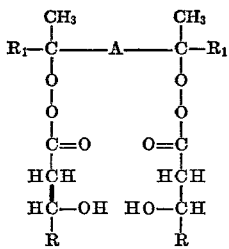

and

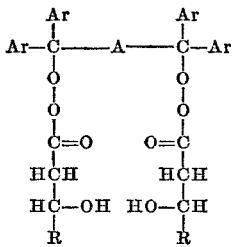

and

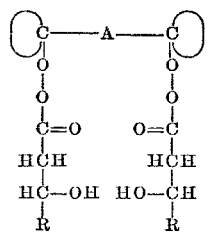

wherein R is at least one member selected from the group consisting of hydrogen and methyl; $R_1$ is selected from the group consisting of methyl and ethyl; Ar is phenyl;

is cyclohexyl and A is selected from the group consisting of —$CH_2$—$CH_2$—, —CH=CH—, —$CH_2$—CH=CH—, and —C≡C—.

References Cited
UNITED STATES PATENTS

| | | | |
|---|---|---|---|
| 3,579,541 | 5/1971 | Chang | 260—338 |
| 3,505,363 | 4/1970 | Milas | 260—389 |
| 3,297,738 | 1/1967 | Mageli et al. | 260—463 |
| 3,214,422 | 10/1965 | Mageli et al. | 260—94.9 |
| 2,537,853 | 1/1957 | Pezzaglia | 260—610 R |

BERNARD HELFIN, Primary Examiner

W. B. LONE, Assistant Examiner

U.S. Cl. X.R.

260—80 C, 89.1, 89.5 92.8 R, 93.5 R